June 29, 1926.  
R. W. WOOD  
OPTICAL TOY  
Filed Nov. 9, 1922
1,590,463
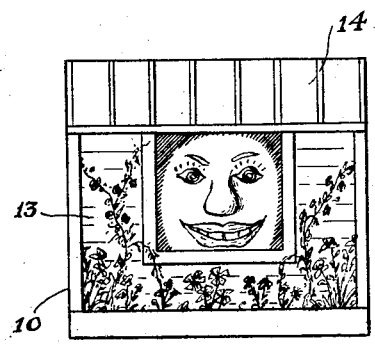
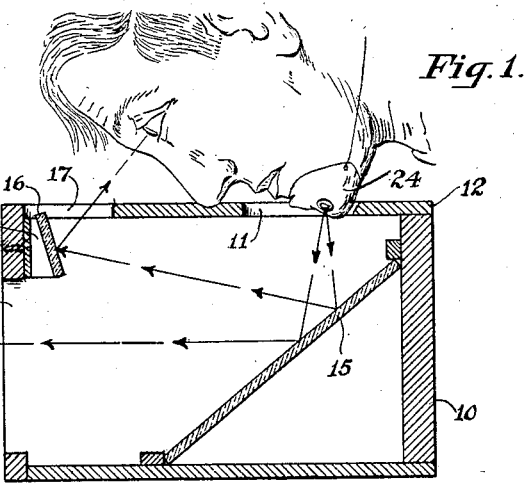
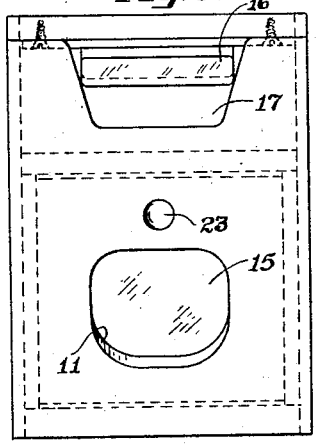
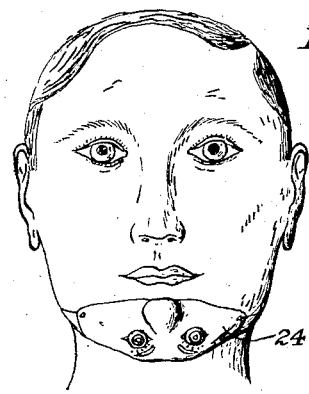
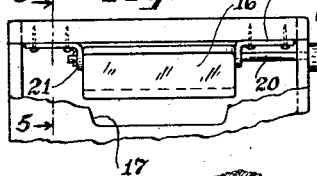
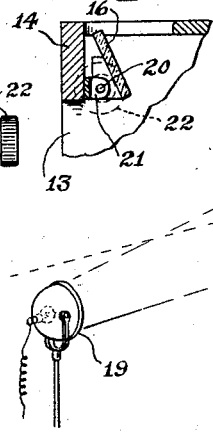
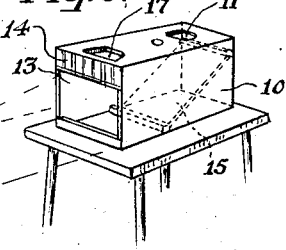
INVENTOR  
R. W. Wood.  
BY Joseph N. Schofield  
ATTORNEY Patented June 29, 1926.

1,590,463

UNITED STATES PATENT OFFICE.

ROBERT W. WOOD, OF BALTIMORE, MARYLAND.

OPTICAL TOY.

Application filed November 9, 1922. Serial No. 599,915.

This invention relates to an amusement device or optical toy by means of which grotesque images of an object may be viewed with the aid of an inclined mirror or other suitable device suitably mounted within an enclosure.

An object of the present invention is to provide reflecting means comprising an enclosure provided with an opening adjacent which may be placed any object adapted to be viewed, such as an animated toy, grotesque object, or false make-up adapted to have its parts relatively movable into different aspects. Another orifice in the reflecting device provides means through which the image of the grotesque or other animated form displayed in the first opening may be viewed, the reflection of the object or form being accomplished by means of an inclined mirror positioned within the device.

Another feature of the invention is that I provide a small supplemental mirror within the device so placed that it enables the operator to properly position the reflecting device relative to those viewing it and to see what is being projected by the device or reflected by the mirror.

More especially, it is an object of the invention to enable a person to apply an elastic or other form or mask to his chin or other part of his face or head and place this elastic or other form, when thus positioned, adjacent the first opening referred to above. In this way a figure including the form or mask and also the operator's lips will be clearly visible to spectators viewing the image of these parts formed in the inclined mirror. By reciting doggerel or humorous verses and with exaggerated movements of the lips, the spectators will see a grotesque face presented which will be reversed by the inclined mirror so that it will be seen in upright position.

As the effect of the inclined mirror within the enclosure is to reverse or invert the position of any object being reflected by the device, I propose to place the object presented for projection in reversed or inverted position. In projecting grotesque or animated figures or objects, I also propose to apply a form, either grotesque or otherwise, directly to the operator's face either by painting thereon or by fixing a false make-up thereto and reflecting the object together with a portion of the operator's face. A form so disposed on the operator's face in reversed position may be displayed by any one of a number of different methods, the method illustrated being one of those preferred.

More particularly, I propose to form on or apply to the operator's face features including a nose and eyes, etc., in inverted form. These displayed on the operator's face in inverted position adjacent the mouth, when viewed by means of the present device, or by any other means by which they may be seen in upright position, simulate a complete grotesque face. In the image, the operator's lips and mouth, which are approximately symmetrical about a horizontal axis, supplement and complete the features applied to the face or chin. In this way, a complete image of a grotesque object such as the combined face and mask or form may be viewed in erect position.

The very extraordinary expressions of the face are due primarily to the fact that the mouth of the person speaking or singing makes unusual grimaces when reviewed in an inverted position. The lower jaw of the image as viewed by the spectators remains practically fixed and all of the movements of the features forming the principal parts of the image are made with what is apparently the upper part of the face. Induced by the movements of the mouth and chin of the person operating the device, the eyes and nose of the image move vertically as the operator continues his speaking or gesticulating. As the chin and mouth of the operator are suitably painted or provided with a grotesque mask, the grimaces are made, or may be made, as ludicrous and of any type desired. The principal object of this invention is therefore to obtain the grotesque effect above described by means of suitable projecting, reflecting, or other means, a part of the face of an operator suitably provided with a mask or painted figure being the part reflected or projected.

With these and other objects in view, my invention consists in the features of construction, operation and method set forth in the following specification and illustrated in the accompanying drawing.

In the drawing:

Figure 1 shows a vertical longitudinal section of one form of the projecting device with an operator in position to project a grotesque image upon the mirror.

Fig. 2 is a front elevation of the device showing the appearance of the image as seen by the spectators.

Fig. 3 is a plan view of the projecting device.

Fig. 4 is a modified detail view showing another means of mounting the supplemental mirror.

Fig. 5 is a sectional view taken on line 5—5 of Fig. 4.

Fig. 6 is a perspective view of the entire device, and

Fig. 7 discloses one method of displaying a grotesque form upon the face of an operator.

Preferably, my invention comprises the following principal parts: first, a box or enclosure having two apertures therein in walls of the device at right angles to each other. One of these walls may be the cover piece of the box and the other the front end thereof. Second, an inclined mirror suitably supported within the box or enclosure so that objects disposed adjacent one of the apertures may be rendered visible when viewed through the other aperture. Third, a supplemental mirror in the forward portion of the box disposed adjacent a small aperture in the cover of the box enabling an operator to properly position the device. Fourth, a preferred method of forming grotesque, animated objects as seen in Fig. 7.

Referring more in detail to the figures of the drawing, 10 shows a suitable enclosure preferably in the form of a box. This is provided with an aperture 11 in its cover plate 12. Another aperture 13 preferably comprising practically the entire front end portion of the box is also provided. These two orifices 11 and 13 provide means respectively for displaying and viewing an object. Within the box 10 in the position as shown is an inclined mirror 15. This is preferably disposed substantially at 45° to the horizontal so that it obliquely faces the apertures 11 and 13 and may be retained in position by the strips as shown. Mounted near the front end of the box is a supplemental mirror 16 and in the cover plate 12 of the box is a small supplemental aperture 17 enabling an operator, when in the position shown in Fig. 1, to clearly see what is being displayed on the mirror 15 and its relation to those viewing its reflection thereon.

The inside surface of the cover piece 12 of the device preferably is suitably ornamented as by painting so that one viewing the device sees the grotesque features surrounded by any desired ornamentation. In the figures of the drawing, the grotesque form disposed opposite the opening 11 appears surrounded by a window and as if it were surrounded by shrubbery. The effect, therefore, is of the features being displayed as if appearing naturally at and looking out of a window. It is to be understood, however, that any other form of ornamentation may be utilized.

For convenience, if desired, the supplemental mirror 16, instead of being mounted upon a rigid frame 18 and fastened to the front wall of the enclosure as indicated in Figs. 1 and 3, may be made adjustable as shown in Figs. 4 and 5. In this modification, the mirror 16 is mounted on a rod 20 rotatably engaging metal strips 21. By means of the knurled head 22, the obliquity of the mirror 16 may be widely varied to properly position it relative to the mirror 15 and the operator.

The above described projecting device is particularly adapted for displaying grotesque images presented through the aperture 11. One method of doing this is clearly indicated in Figs. 1 and 7. The operator either paints a grotesque form upon, or applies one to his face by means of a false face preferably of rubber or other suitable material such as papier-mâché, the grotesque outlines of which form features such as eyes and a nose. These are disposed as clearly indicated in Fig. 7, centrally upon the operator's face directly below the lower lip, so that the eyes and nose which have been painted on the chin, or the applied mask, form a false face in inverted position relative to the operator's lips. By the operator placing himself in the position shown in Fig. 1 with the elastic false face or painted features and also with his own lips adjacent the aperature 11, a spectator in the position shown in Fig. 6 will see an image somewhat similar to that shown in Fig. 2. The reflecting device also is suitably illuminated by the lamp 19 in the position shown in Fig. 6.

The effect of the mirror and method of reflecting the objects displayed is to reverse or invert the relative positions of the operator's lips and the grotesque features painted upon his chin so that the features, while grotesque, appear to the spectators to be in proper relation to each other.

Instead of the operator placing parts, such as false faces, upon his chin, any animated device may be placed in front of aperture 11 which will be viewed in reversed or erected position through the aperture 13. To aid the operator in projecting objects applied to his face, a small depression 23 may be provided against which the operator's nose may be placed.

In the preferred method of projecting objects contemplated particularly for amusement purposes, the operator in the position shown in Fig. 1 will recite humorous or doggerel paragraphs or verses while exaggerating the movements of the muscles of the face and chin in so doing. The effect of this will be to distort the relative positions of the eyes and nose forming the false face applied to his chin, and, in combination with the natural or exaggerated movements of the lips in speaking will produce a moving or animated grotesque picture upon the mirror 15.

The same inverted position of a false make-up applied to the chin of a person may be utilized for the production of comic motion picture films. Also, the operator in rear of a screen in inverted position may, without interposition of any optical devices, display a grotesque or other form displayed in inverted position upon his chin.

What I claim is:

1. A reflecting device comprising in combination, an enclosure, a wall thereof having an aperture therein through which objects may be reflected, another wall at right angles thereto having an aperture through which an image of said reflected object may be viewed, an inclined mirror within said enclosure obliquely facing said walls upon which said object is displayed and its image reflected, and a supplemental mirror within said enclosure enabling an operator in front of the aperture through which objects are reflected to view the image reflected upon the mirror.

2. A reflecting device comprising in combination, an enclosure, a wall thereof having an aperture therein through which objects may be reflected, another wall at right angles thereto having an aperture through which an image of said reflected object may be viewed, an inclined mirror within said enclosure and obliquely facing said walls upon which said object is displayed and its image reflected, a supplemental aperture adjacent the aperture through which the objects are displayed, and an adjustable mirror associated therewith to enable an operator in front of the aperture through which objects are reflected to view the image reflected upon the mirror.

3. A reflecting device comprising in combination, an enclosure, a wall thereof having an aperture therein through which objects may be reflected, another wall at right angles thereto having an aperture through which an image of said reflected object may be viewed, an inclined mirror within said enclosure and obliquely facing said walls upon which said object is displayed and its image reflected, a supplemental aperture adjacent the aperture through which the objects are reflected, and an adjustable mirror associated therewith, said supplemental aperture being spaced from said first mentioned aperture whereby an operator may reflect parts of his face and simultaneously view their reflection on the inclined mirror.

In testimony whereof, I hereto affix my signature.

ROBERT W. WOOD.